W. C. ATHERTON.
COMBINATION WEIGHING SCALE AND ICE BOX.
APPLICATION FILED NOV. 16, 1912.
1,120,883.
Patented Dec. 15, 1914.
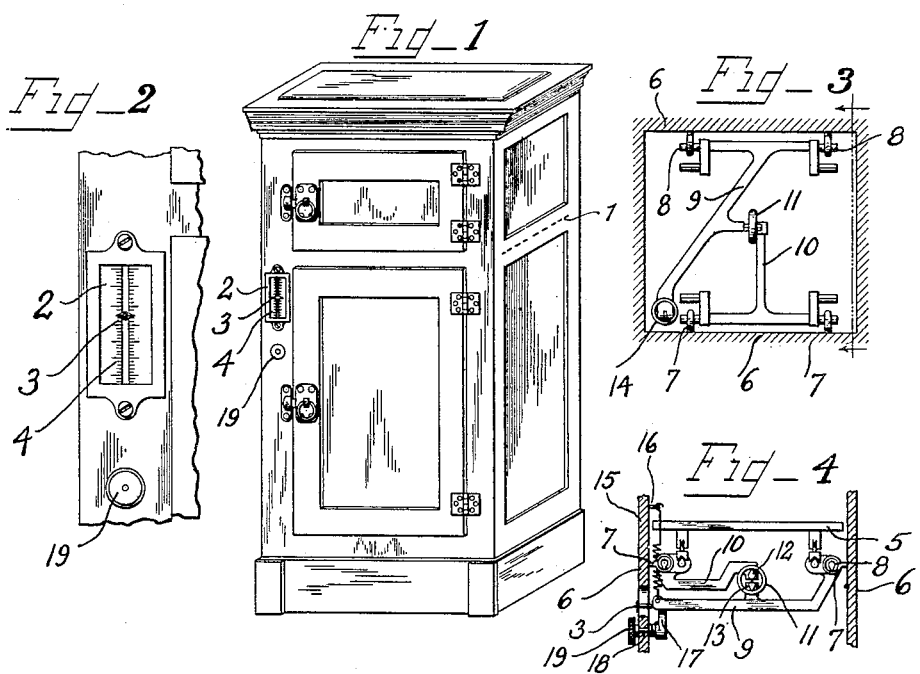
WITNESSES.
INVENTOR
Walter C. Atherton
BY
ATTORNEYS

UNITED STATES PATENT OFFICE.

WALTER C. ATHERTON, OF MILWAUKEE, WISCONSIN.

COMBINATION WEIGHING-SCALE AND ICE-BOX.

1,120,883.   Specification of Letters Patent.   Patented Dec. 15, 1914.

Application filed November 16, 1912. Serial No. 731,891.

*To all whom it may concern:*

Be it known that I, WALTER C. ATHERTON, a citizen of the United States, residing at Milwaukee, county of Milwaukee, and State of Wisconsin, have invented new and useful Improvements in Combination Weighing-Scales and Ice-Boxes, of which the following is a specification.

The object of my invention is to provide an ice box of ordinary construction with a weighing scale, such parts being so constructed and arranged that when a cake of ice is placed in the ice box, it will rest upon the platform of the scale, which is located in such box, while the weight of the ice will be indicated by the movement of a pointer or index scale connected with said platform, the index scale being located in a convenient place to be seen upon the exterior of the ice box.

My invention pertains more especially, among other things—1st, to the device for communicating motion from the ice supporting platform within the ice box to the weighing mechanism located upon the exterior of the box, and 2nd, to the device for supporting a platform when not in use, independently of the weighing mechanism, and to the device for manually releasing the platform from such support when desirous to ascertain the weight of a block of ice on the platform.

My invention is explained by reference to the accompanying drawings, in which—

Figure 1 is a perspective view of a refrigerator of ordinary construction, provided with an ice box in which a weighing platform is located, the index scale being shown upon the exterior of the refrigerator. Fig. 2 represents an enlarged view of one side of the refrigerator shown in Fig. 1. Fig. 3 is a plan view of the mechanism for supporting the weighing platform. Fig. 4 is a vertical section of the device for supporting the weighing platform in connection with said platform.

Like parts are identified by the same reference numerals throughout the several views.

By the style of refrigerator shown in Fig. 1, the ice and the weighing platform upon which the ice is located, are preferably located at the top of the refrigerator above the horizontal partition 1, indicated in dotted lines, and the platform is so connected with the index scale 2 that as soon as a cake of ice is placed upon the platform, its weight will be indicated by the movement of a pointer 3 over the index characters 4 of the dial, whereby the purchaser of the ice can readily ascertain the weight of the cake, which has been placed upon the platform.

5 represents a platform upon which the ice is placed. The platform 5 is supported from the respective walls 6, 6, of the inclosing box, through the eye-bolts 7, V-shaped bearings 8, which bearings are pivotally connected with said eye bolts, scale arms 9 and 10, which scale arms 9 and 10 are pivotally connected together by a ring 11 and V-shaped bearings 12 and 13, the V-shaped bearings 12 being formed in connection with the scale arm 9 and the V-shaped bearings 13 being formed in connection with the scale arm 10. The bracket 9 extends diagonally beneath the platform and is connected with the lower end of a spiral spring 14 at one corner of the ice box, and said spring is connected at its opposite end with the wall 15 of the ice box through a supporting member 16, whereby when a cake of ice is placed upon the platform 5, the spring 14 will be drawn out a greater or less distance corresponding with the weight of the cake of ice, when the weight of the ice will be indicated by the movement of the pointer 3 over the index characters on the scale.

17 is an eccentric bearing, which is supported from the wall 15 of the ice box through the shaft 18 and the protruding end of the shaft 18 is provided with a knob 19, by which the eccentric is turned, whereby it is obvious that when desirous to relieve the spring or weighing mechanism from the weight of the ice, the eccentric 17 is turned so as to bring it in contact with the lower side of the arm 9, whereby the spring 14 is relieved from the weight upon the platform.

Having thus described my invention, what I claim as new and desire to secure by Letters Patent, is—

1. In a device of the described class, the combination of an ice box, a weighing platform located in said box, a scale arm located beneath said platform, an index scale located upon the exterior of said box, means for communicating motion from said platform within the box to said index scale upon the exterior of said box, an eccentric revolubly supported beneath the scale arm within the box, an eccentric supporting shaft secured at one end to said eccentric and extending from thence through the wall of the box, and means connected with said shaft for operating said eccentric.

2. In a device of the described class, the combination of an ice box, a weighing platform located in said box, scale arms located beneath said platform, an index scale located upon the exterior of said box, an index pointer adapted to move over the characters of said index scale, means for communicating motion from said weighing platform to said index pointer, an eccentric revolubly supported beneath the scale arms within the scale box, an eccentric supporting shaft secured at one end to said eccentric and extending from thence through the wall of the box, and a handle affixed to the protruding end of said shaft.

In testimony whereof I affix my signature in the presence of two witnesses.

WALTER C. ATHERTON.

Witnesses:
   JAS. B. ERWIN,
   IRMA D. BREMER.

Copies of this patent may be obtained for five cents each, by addressing the "Commissioner of Patents, Washington, D. C."